United States Patent [19]

Griesdorn

[11] 4,379,018

[45] Apr. 5, 1983

[54] HEAT TRANSFER APPARATUS

[75] Inventor: Carl P. Griesdorn, Cincinnati, Ohio

[73] Assignee: Planet Products Corporation, Cincinnati, Ohio

[21] Appl. No.: 331,570

[22] Filed: Dec. 17, 1981

[51] Int. Cl.$^3$ ........................ B30B 15/34; B32B 31/20

[52] U.S. Cl. .................................. 156/359; 100/93 P; 156/285; 156/366; 156/368; 156/382; 156/579; 156/583.1; 219/243

[58] Field of Search ............... 156/285, 359, 366, 368, 156/382, 497, 579, 583.1; 100/93 P; 219/243

[56] References Cited

U.S. PATENT DOCUMENTS

| | | | |
|---|---|---|---|
| 2,705,523 | 4/1955 | Hasselquist | 156/285 |
| 3,146,143 | 8/1964 | Bolesky et al. | 156/382 |
| 3,813,270 | 5/1974 | Hix et al. | 156/382 |
| 3,888,719 | 6/1975 | Gibbs et al. | 156/382 |
| 4,283,242 | 8/1981 | Regler et al. | 156/382 |

*Primary Examiner*—Michael G. Wityshyn
*Attorney, Agent, or Firm*—Kinney and Schenk

[57] ABSTRACT

A heat transfer apparatus includes a dome type enclosure member with a heating element internally mounted within a dome formed within the member. The diaphragm cooperatively forms a variable volume chamber with the enclosure member and is movable toward the heating element under the impetus of atmospheric air as air is evacuated from chamber.

15 Claims, 6 Drawing Figures

HEAT TRANSFER APPARATUS

BACKGROUND OF THE INVENTION

The present invention relates generally to heat transfer equipment, and more particularly concerns an apparatus that may be used for diverse heat transfer applications which range from transferring images from a release paper to a fabric (such as a T-shirt) to heat sealing packages, such as preformed blister packages for drugs. The invention will be specifically disclosed by way of example, in connection with an apparatus which is used to transfer images onto small pieces of fabric (such as a T-shirt). The potential use of the apparatus is, however, far more diversified.

Present heat transfer equipment for transferring images from release paper onto fabric, such as T-shirts, are of two general types. The first of these two types could be characterized as a clam shell design or a book type design. This equipment has a series of levers and links that attach to an upwardly moving hot plate which opens and closes above a lower permanent platen in a clam shell like manner. An operator will place a garment, such as a shirt, onto the top of the lower permanent platen (which may be covered by rubber or the like) and manually pivot the upward moving hot plate into contacting relationship with the lower platen. As the operator pulls a lever attached to the upper hot plate downwardly, the lever goes through a toggle action to provide adequate pressure between the hot plate and the lower platen. Present day machines of this design have several disadvantages. First of all, most of these machines are not made with great precision with the consequence that point loading frequently results when pressure is applied between the upper hot plate and the lower platen. With an uneven distribution of pressure throughout the transfer area, portions of the transfer with less than the maximum point pressure will be of low quality. With inadequate pressure at certain areas, the transfer may tend to bubble and eventually sever from the fabric.

The hot plate in the upper platen of the clam shell design rests at approximately a 30° angle to the horizontal lower platen when in an open position. Thus, the hot plate is exposed to the environment during most of the operation time. When this hot plate is radiating heat into an air conditioned environment, such as a store, the operator must not only pay for the energy to generate the heat in the hot plate, but also to extract that heat from the environment through the air conditioner. This radiating hot plate is also disadvantageous in that this radiated energy tends to curl die cut letters which are arranged upon the lower platen of the machine. When such curling occurs, it is frequently the case that the hot plate will contact the corner of the curled letters prior to the rest of the letter when the platens are closed. A misalignment of the letters may result. Moreover, when the store operator is lettering or placing the die cut letters on a garment with such a machine, very little clearance is provided between the operator's knuckles and the hot plate. Since the hot plate may be between 350°-375° F., contact with the operator's skin may result in serious burns.

In the past, in an effort to overcome the burning of the operator's hands, a sleeve-like heat shield has been designed to put over the upper hot plate. With such a heat shield, the operator manually inserts the sleeve over the upper hot plate while the garment on the lower plate is being aligned for lettering. It is then necessary to manually remove the sleeve-like heat shield prior to closing the machine. Due to time and inconvenience required in placing the heat shield over the hot plate and subsequently removing it prior to actual operation of the equipment, many operators have opted to use the devices without heat shields.

Still further, many of these prior art machines, due to their complexity and moving parts, have been of questionable reliability. As a result, many store owners have resorted to the use of multiple machines in order to have backup capability in the event that the first machine becomes inoperative.

A second general type of machine commonly used for transferring images onto fabric has a vertical post and a hot plate which is swingingly cantilevered off the post. The operator places the garment on a platen with the hot plate swung to one side. When the garment and transfer are in proper placement on the lower platen, the hot plate is swung to a position above the garment and lowered thereon. These swinging cantilevered type machines are extremely heavy, space consuming, expensive and difficult to install.

The present invention provides a substantially smaller and less expensive piece of equipment which will perform the heat transfer applications of the machine discussed above with improved results. Applicant's invention is much more energy efficient and alleviates the need for cams, levers, gears and air cylinders to get the pressure required for applying heat transfers. The apparatus of the present invention is not limited to or controlled by the operator in any way and allows transfers of uniformly high quality. An apparatus embodying the invention may also be made relatively small and light so that it may be readily transported and utilized in a relative small space.

The present invention is also highly useful as a heat sealing machine for packaging material. A machine made in accordance with the invention would be capable of permanently attaching a peelable lidding material to a preformed blister for the unidose packaging of drugs, for example. Such a machine could be used by a local pharmacist or a pharmacist in a hospital for unit packaging of prescription drugs.

In many states, drugs sold to nursing homes must be unidose packaged before they are delivered to the nursing home. The equipment that is presently used for packaging this material is of an air cylinder platen press type design. The equipment, by its design, dictates that the pharmacist has a compressor, and that the machine be relatively heavy and cumbersome. A machine made in accordance to the present invention could be relatively small and placed upon a retail counter of a pharmacy. It could also be used in a hospital pharmacy for providing unidose packaging of medication for the various patients in the hospital.

Many hospitals today distribute unidose packages of medication. The present invention would permit a permanent seal for the packaging for the medication which would not be reclosable. It is common knowledge that hospitals presently experience substantial problems from pilferage of many drugs, particularly those drugs that have high black market values. It is possible, with the pressure sensitive packages that are presently used, for a hospital employee to open the pressure sensitive label, remove the drug (which may be a narcotic), replace the stolen drug with a placebo and reclose the package. With a permanent seal package such as would be possible with the present invention, it would be readily apparent if an unauthorized person tampered with the medication. Many times the switching of the drugs is not detected and the patient for whom the medication was prescribed is erroneously viewed as having failed to respond to the medication.

Accordingly, it is an object of the present invention to provide an improved heat transfer apparatus that will produce higher quality heat transfers at a lower cost.

It is a further object of the present invention to provide an apparatus that will achieve the required pressure to affectuate high quality heat transfers with the necessity of cams, levers, gears, and air cylinders.

It is yet another object of the present invention to provide a heat transfer apparatus that is not dependent upon the operator for application of pressure.

It is still another object of the present invention to provide a heat transfer apparatus of increased productivity.

It is yet another object of the present invention to provide a heat transfer apparatus that will minimize the physical space requirements needed for the apparatus and its operation.

Another object of the present invention is to provide a heat transfer apparatus that will operate more efficiently and use less energy than equivalent present day machines.

It is yet another object of the present invention to provide a heat transfer apparatus that is safe to operate.

It is yet a further object of the present invention to provide a heat transfer apparatus that may also be used for curing heat transfer images.

Still another object of the present invention is to provide a heat transfer apparatus that will apply a uniform pressure between a heating element and a heat transfer image.

It is yet a further object of the invention to provide a heat transfer apparatus that will enable high quality heat transfers on fabrics of irregular shapes with bulky sections.

It is still another object of the present invention to provide a heat transfer apparatus that may be used to seal packages.

SUMMARY OF THE INVENTION

In accordance with the invention, a heat transfer apparatus is provided which includes a dome type enclosure member with a peripheral sealing surface. The enclosure member includes an internal top portion that is in spaced relationship to the peripheral sealing surface. A heating element is secured to the internal top portion of the enclosure member in spaced relationship to this peripheral sealing surface. A diaphragm is also provided which is in selective sealing relationship with the peripheral sealing surface and is exposed to atmospheric pressure on one of its sides. The other of the diaphragm's sides cooperates with the enclosure member to define an internal chamber. A tool buildup is secured to this diaphragm and disposed within the internal chamber when the peripheral sealing surface is in sealing engagement with the diaphragm.

In accordance to a further aspect of the invention, means are provided for selectively evacuating air from the internal chamber. The diaphragm is flexibly movable in response to this evacuation of air to move the tool buildup between a first position in which it is in spaced relationship with the heating element and a second position in which it is in contacting relationship to the heating element.

In accordance with a still further aspect of the invention, means are provided for selectively permitting ambient air into the chamber after air has been evacuated therefrom and while the peripheral sealing surface is in sealing relationship with the diaphragm.

A further specific aspect of the invention provides for handle means on the enclosure member for manually moving the enclosure member.

In accordance to a further and more specific aspect of the invention, a vacuum release mechanism is provided that selectively blocks a passageway between the chamber and the ambient atmosphere. The vacuum release mechanism is biased to a closed position in which the passageway is blocked.

Yet another aspect of the invention includes a pair of handles secured to the enclosure member with the vacuum release mechanism being located proximal to one of the handles.

In accordance to a further aspect of the invention, means are provided for controlling the temperature of the heating element.

In yet another aspect of the invention, a control box is secured to the exterior of the enclosure member for housing a timing mechanism and a temperature control means as well as a vacuum gauge which provides a visual indication of the air pressure within the chamber.

In accordance to a still further aspect of the invention, the enclosure member has a truncated pyramidal configuration.

According to a still further aspect of the invention, the tool buildup includes a platen member which is selectively engagable with the heating element and in spaced relationship to the diaphragm.

A still further aspect of the invention includes a fluid conduit extending through the enclosure member and providing fluid communication between the chamber and an external vacuum source.

According to a still further aspect of the invention, a switch means is provided which is responsive to placement of the enclosure member over the diaphragm for activating a vacuum pump.

According to a still further and specific aspect of the invention, the switch means includes a plunger positioned in the enclosure member to contact the tool buildup whenever the enclosure member is placed upon the diaphragm.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
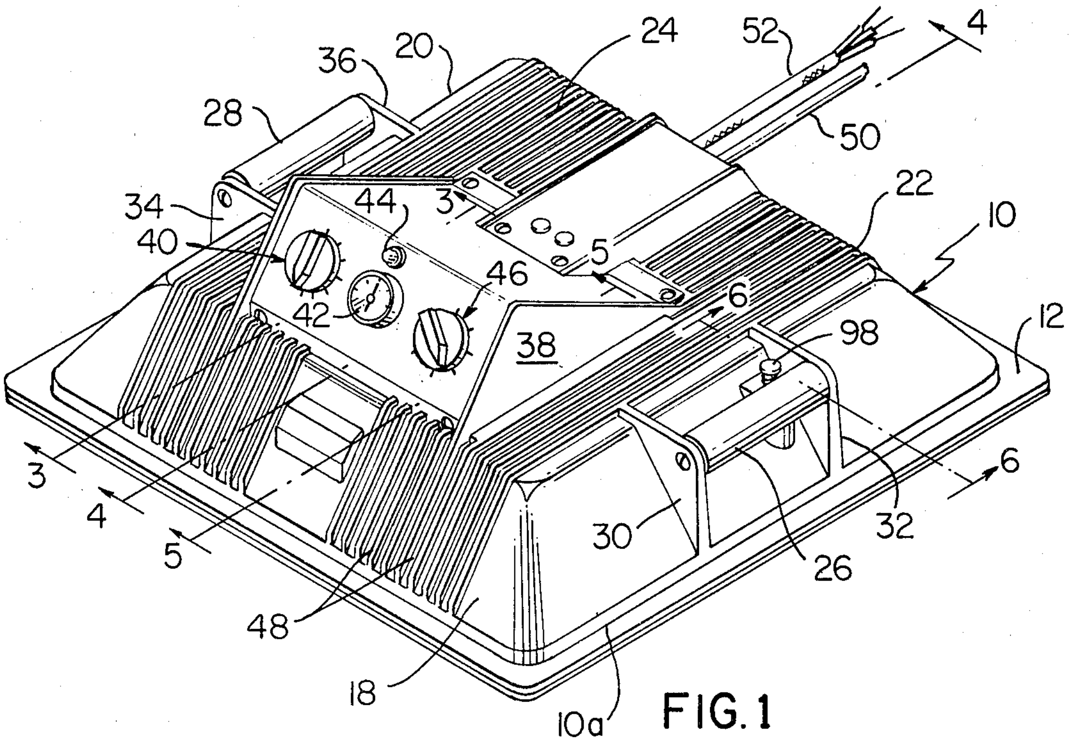
FIG. 1 is a perspective view of a hand held hat-type casting with a hot plate secured therein in a preferred form of the present invention.

Referring now to the drawings and to FIG. 1 in particular, an enclosure member in the form of a hat-type casting 10 is shown mounted atop a diaphragm 12. The enclosure member has a truncated pyramidal configuration which includes four angled side walls 16, 18, 20 and 22 which are mutually joined by a top 24. The sides 16 and 20 have handles 26 and 28 respectively which are each mounted between a pair of bosses, handle 26 being mounted between bosses 30 and 32 and handle 28 being mounted between bosses 34 and 36. These handles 26 and 28 enable an operator to manually grasp the hat-type casting 10 for insertion upon and removal from the diaphragm 12.

A control box 38 is mounted upon top 24 for housing a timer 40, a vacuum gauge 42, a pilot light 44 and a thermostat 46. FIG. 1 also shows that the enclosure member 10 has a plurality of fins 48 extending over the top 24 and side walls 18 and 24 in a parallel alignment. As will be apparent to those skilled in the art from the following description in connection to heater 86 (FIG. 3), these fins 48 serve to dissipate heat from the casting 10. Substantial heat is generated within the casting 10 by the heater 86 during the operation of the illustrated embodiment as will be described below. It may also be seen from FIG. 1 that a vacuum tube 50 and a four wire cable 52 enter the enclosure member 10 through the side wall 22.

Figure 2:
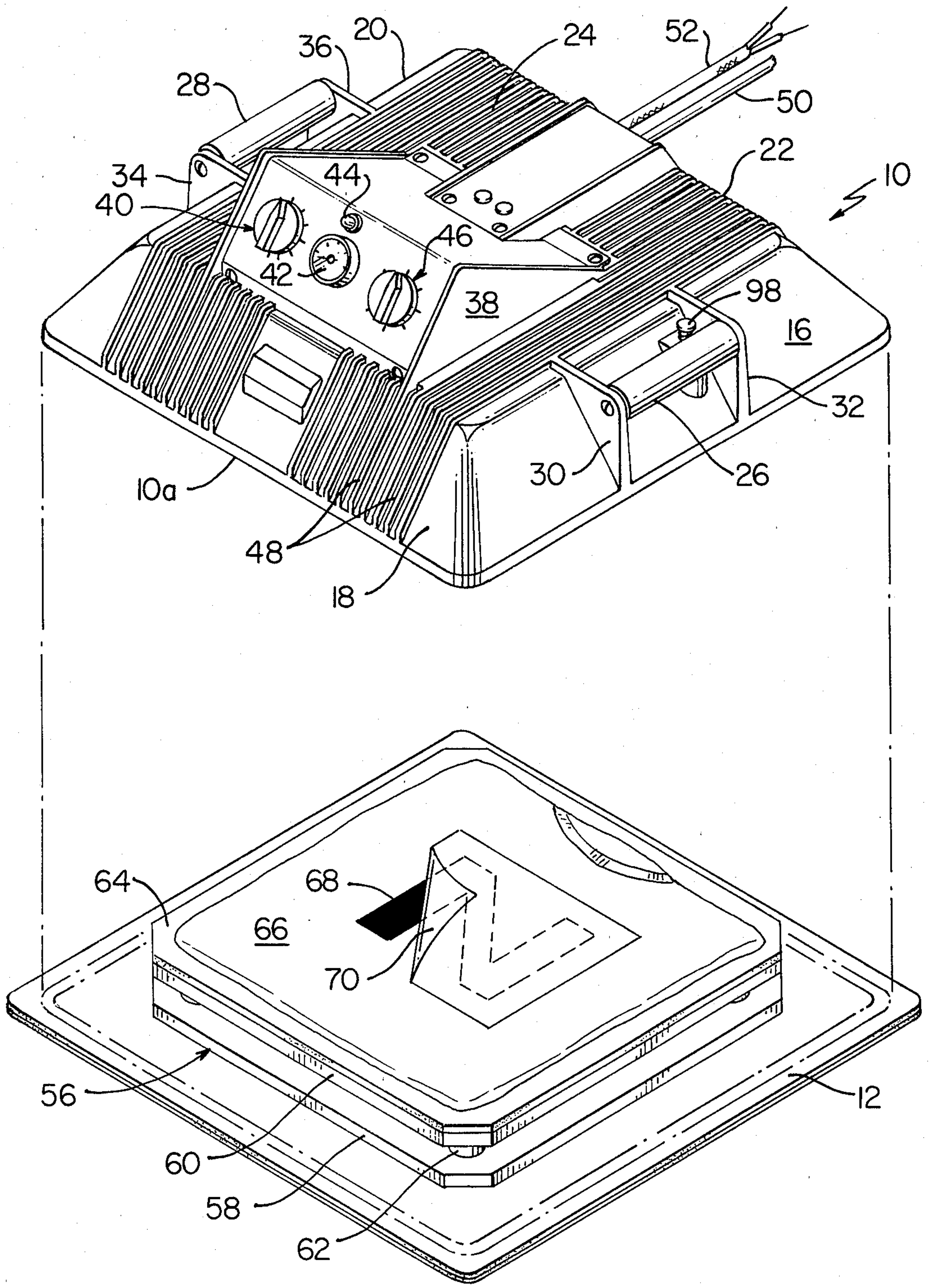
FIG. 2 is an isometric view of the hat-type casting of FIG. 1 depicting the casting positioned above a diaphragm having a tool buildup with a garment placed upon the tool buildup.

FIG. 2 shows the enclosure member 10 separated from and positioned over the diaphragm 12. The diaphragm 12 is formed of ABS plastic and has a top sheet 54 of a resiliently deformable material such as foam rubber covering the diaphragm's top surface. As will be explained later, this resiliently deformable sheet 54 serves as a seal whenever the enclosure member 10 is rested upon the diaphragm 12. The enclosure member 10 has a peripheral sealing surface 10*a* (FIG. 2) about its base periphery which sealingly engages the diaphragm 12 when the enclosure member 12 is so rested.

Figure 3:
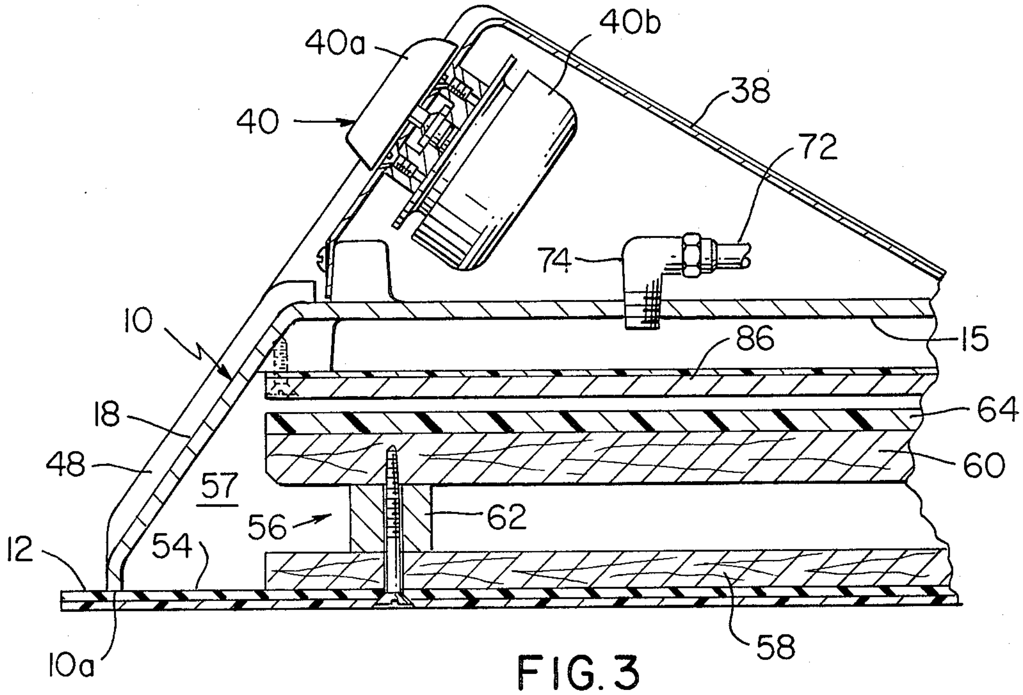
FIG. 3 is a fragmentary elevational view, partially in cross section, of the casting of FIGS. 1 and 2 in placement over the tool buildup of FIG. 2 taken along line 3—3 in FIG. 1.
Figure 4:
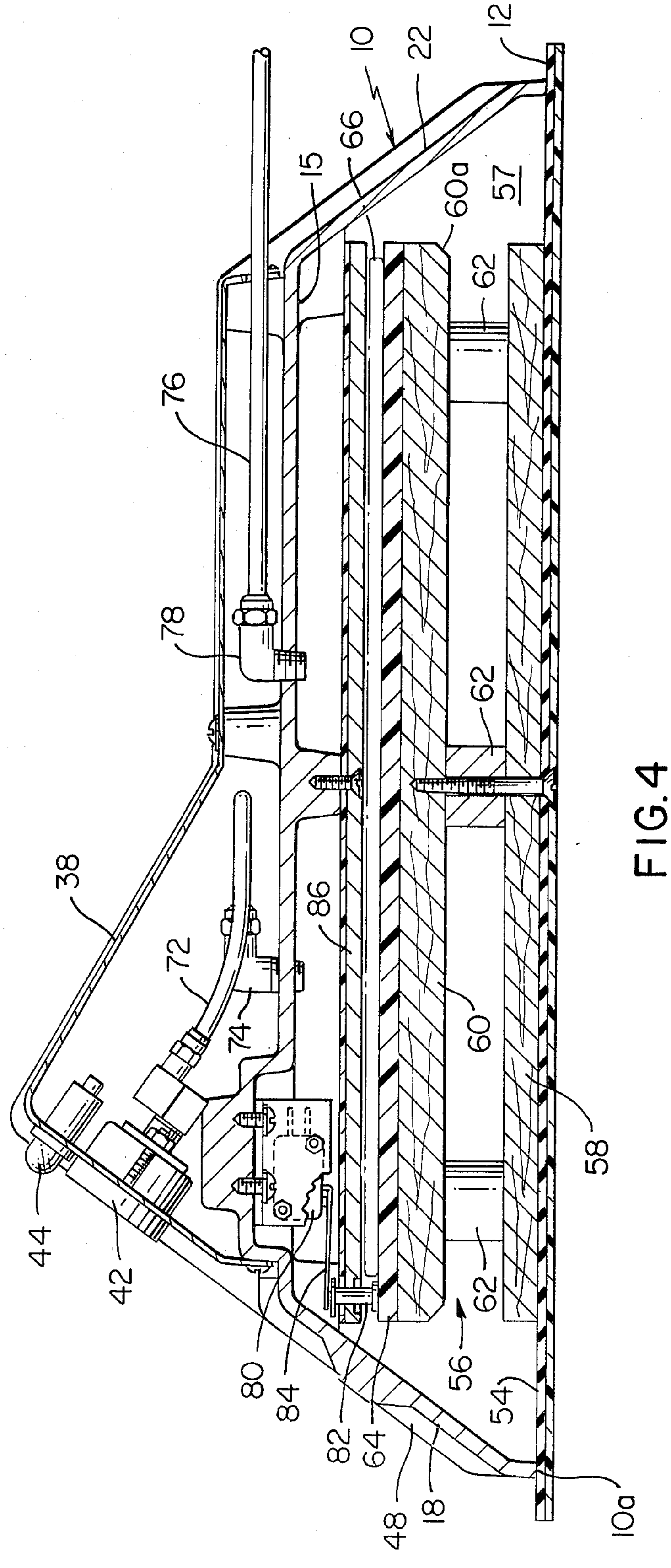
FIG. 4 is a cross sectional elevational view taken along line 4—4 in FIG. 1 depicting the hat-type casting in operative relationship with the diaphragm and tool buildup.

FIGS. 3-6 show the enclosure member 10, and the peripheral sealing surface 10*a* in particular, in sealing engagement with the diaphragm 12. The enclosure member 12 forms an internal dome 15 beneath its truncated pyramidal configuration. A tool buildup generally designated by the numeral 56 is secured in spaced relationship to the diaphragm 12 and fitted internally of this dome 15. The tool buildup 56 includes a first substantially planar piece of die board 58 which is separated from a second and similar substantially planar die board 60 by a plurality of spacers 62. This second die board 60 forms a platen which is illustrated with truncated corners and a lower chamfered peripheral corner 60*a*. FIGS. 3 and 4 also illustrate flat headed wood screws that extend through the diaphragm 12, die board 58, spacers 62 and into die board 60 for securing the tool buildup 56 to the diaphragm 12. A silicone sheet 64 is applied to the upper surface of the platen 60. In operation, a garment, such as T-shirt 66, is placed on the silicone sheet for transferring images thereon. A letter 68 is shown being applied to the T-shirt 66 in FIG. 2 as release paper 70 is being removed from the top side of the letter 68.

As indicated above, the control housing 38 includes a timer 40, a vacuum gauge 42, a pilot light 44 and a thermostat 46. The cross sectional illustration of FIG. 3 shows the manner in which the timer 40 is mounted in the control box housing 38. The timer 40 includes a manually turnable dial 40*a* which interacts through the housing 38 with a clock mechanism in a housing 40*b*. Since timers of this nature are widely available commercially and would be readily apparent to a skilled artisan, further description thereof will be omitted in the interest of brevity.

The cross sectional depiction of FIG. 4 most clearly shows the relationship between the enclosure member 10, diaphragm 12 and tool buildup 56 after the casting 10 has been placed upon the diaphragm 12, but prior to evacuation of air from the closed chamber 57 formed by the diaphragm 12 and the dome 15. In this illustration, the vacuum gauge 42 is shown fitted in the control housing 38 and connected to a tube 72. The tube 72 extends into a fitting 74, which in turn extends interiorly of the chamber 57 to provide fluid communication between the gauge 42 and the closed chamber 57. It should be readily apparent, the gauge 42 senses the air pressure in the chamber 57 through the tubing 72 and fitting 74 and provides a visual output of the sensed pressure on the exterior face of gauge 42. Again, vacuum gauges of this nature are well known in the art and detailed description of the gauge 42 will thus be omitted in the interest of brevity.

As suggested above, when the enclosure member 10 is sealingly rested upon the diaphragm 12, air is evacuated from the chamber 57. An external vacuum source developed by a vacuum pump (not shown) communicates with the chamber 57 by way of a vacuum tube 76 (FIG. 4) and fitting 78. The vacuum pump (not shown) is activated through a microswitch 80 which is controlled by a switch plunger 82. When the enclosure member 10 is properly placed on diaphragm 12, the switch plunger 82 engages the top of the silicone covered platen 60 and undergoes upward movement relative to the enclosure member 10, which movement, in turn, activates the switch 80 to turn on the vacuum pump (not shown). A lever 84 extending from the switch 80 to the switch plunger 82 provides mechanical interconnection between those two elements. This lever 84 is biased to an "off" position, the bias of the lever 84 being overcome by the weight of the enclosure member 10 when the enclosure member is properly fitted on the diaphragm 12.

The top of the dome 15 has a heater assembly 86 which is designed to come into contact with the garment 66 as the garment 66 is rested upon the silicone covered platen 60 for transferring the image of letter 68 to the garment 66. The top of this dome 15 and the heating element 86 are in spaced relationship to the peripheral sealing surface 10*a*. As seen from FIG. 4, the dome 15 and the tool buildup 56 are designed to provide a slight spacing between the garment 66 as it lies on the silicone covered platen 60 prior to evacuation of the air within the chamber 57. However, when the enclosure member 10 is placed on the diaphragm above the tool buildup 56, the switch plunger 82 engages the top of that tool buildup 56 and is moved relative to the enclosure member 10 to activate the switch 80 and to energize the vacuum pump (not shown). When so energized, the vacuum pump evacuates the air under the dome 15 through fitting 78 and tubing 76 to create a partial vacuum within the chamber 57. The outside air pressure thus acts upon the exterior surface of the diaphragm 12 to raise that diaphragm 12 relative to the enclosure member 10 so that the tool buildup 56 is in contacting relationship with the heater 86. As the vacuum pump removes more air from the chamber 57, the pressure between the heater 86 and tool buildup 56 approaches that of the ambient atmospheric pressure.

Figure 5:
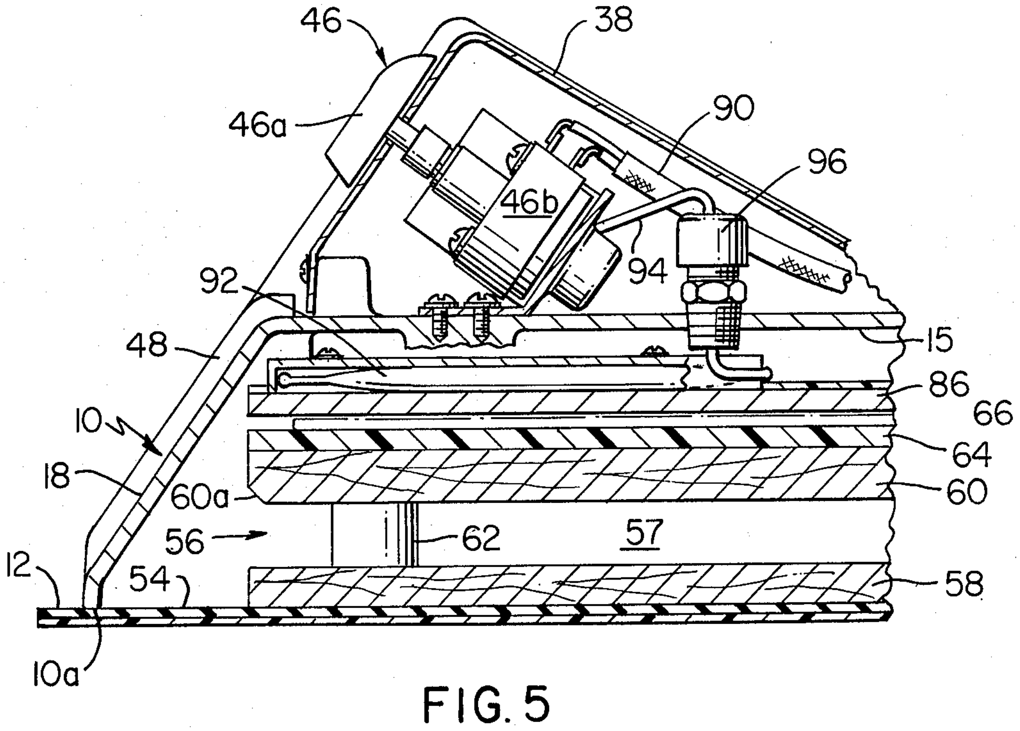
FIG. 5 is a fragmentary elevational view, partially in cross section, of the hat-type casting of FIGS. 1-4 in placement over the tool buildup taken along line 5—5 in FIG. 1.
Figure 6:
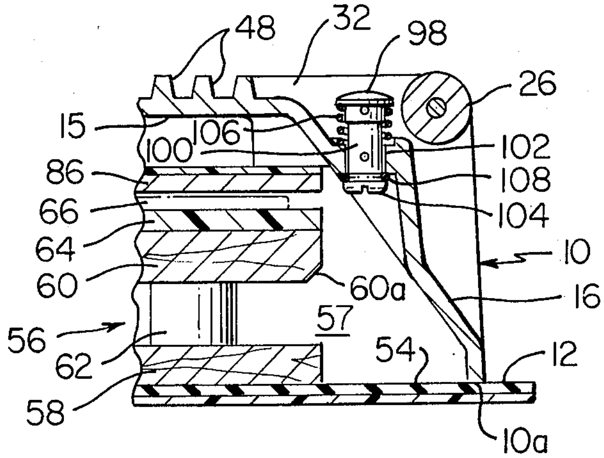
FIG. 6 is a fragmentary elevational view, partially in cross section, taken along line 6—6 in FIG. 1 and depicting a pressure relief valve.

FIG. 5 shows the thermostat 46 mounted inside the control housing 38 with a manual turnable dial setting 46*a* positioned outside the housing 38. The manual dial 46*a* is rotatably connected to a thermostat mechanism contained within a thermostat housing 46*b*. This thermostat housing 46*b* is disposed inside the control housing 38. The thermostat 46 receives electrical energy from an external source (not shown) through a series of wires 90 and controls electrical imput to heating element 86 (which is of the electrical resistance type). The thermostat 46 compares the actual heater temperature as sensed by heat sensor 92 and communicated to thermostat 46 by way of a wire 94. A cable fitting 96 is shown in FIG. 5 for passing the wire 94 through the casting 10 while maintaining a seal between the interior of the dome 15 and the control housing 38. A seal is necessary at this location since control housing 38 is not air tight.

A vacuum release button 98 is provided for dissipating the vacuum inside the dome 15 whenever it is desired to separate the hat type casting from the diaphragm 12. This vacuum release button 98 is illustrated in both FIG. 1 and in the sectional view of FIG. 6. The vacuum release button 98 is mounted upon a cylindrical shaft 100 which is closely fitted within an aperture 102 in the casting 10 for reciprocal axial movement therethrough. A pan head screw 104 is threadably secured to the lower end of the shaft 100 and this screw 104 has a head which is larger than the aperture 102 so as to limit axial upward movement of the shaft 100. The shaft 100 is normally biased upwardly by a compression spring 106 which circumscribes the shaft 100 between the vacuum release button 98 and the casting 10. The bias of spring 106 urges the head of screw 104 into compressive sealing engagement with an O-ring 108 disposed about the shaft 100 and interposed between the head of the screw 104 and the casting 10. When it is desired to release vacuum in the chamber 57, the button 98 is depressed against the bias of spring 106. When so depressed, the sealing relationship between the screw 104 and the casting 10 by way of the O-ring 108 is terminated and air rushes through the passageway formed by aperture 102 into the chamber 57.

In typical operation, the diaphragm 12, with its attached tool buildup 56, is mounted in a retail store up on a pedestal or table or the like. With the enclosure member or casting 10 separated and removed from the diaphragm 12, the top platen 60 is completely open for easy operator access. A garment, such as a T-shirt 66 in FIG. 2, is placed upon the platen 60 and a selected image is aligned on the garment 66. After the transfer image is properly aligned upon the garment 66, the enclosure member 10 is placed atop the diaphragm 12 with the peripheral sealing surface 10*a* in sealing relationship with the diaphragm 12 and the heating element 86 spaced intimately above the garment 66 and aligned image transfers 68. With the thermostat 46 set to limit the temperature of heating element 86 to a desired preset level, the timer 40 is set to the time required for effectuating the desired transfer. The placement of the enclosure member 10 over the tool buildup 56 forces axial displacement of the switch plunger 82 relative to the enclosure member 10 to activate the vacuum pump (not shown) as described above.

The vacuum pump serves to evacuate air from the closed chamber 57 defined by the dome 15 and the upper surface of diaphragm 12 and the partial vacuum developed in this chamber 57 causes a disparity in the pressure acting upon opposite sides of the diaphragm 12. The pressure on the interior surface of the diaphragm 12 becomes increasingly less than that of the atmospheric pressure applied to the exterior surface of the diaphragm 12. As a result of this disparity in pressure, the diaphragm 12 will flex and the tool buildup will be forced upwardly into engagement with the heating element 86. As the closed chamber in the chamber 57 approaches complete evacuation of air, the tool buildup 56 is forced against the heating element 86 by a force which approaches that of the ambient atmospheric pressure.

As mentioned above, the timer 40 is set for a time which is sufficient to effectuate transfer of the desired image 68 onto the garment 66. After expiration of this time period is indicated by timer 40, the operator grasps the handles 26 and 28 with his/her hands and depresses vacuum release button 98. This vacuum release button 98 is located proximal to the handle 26 and is designed so that it may be depressed with the operator's thumb as the operator grasps the handle 26. When the vacuum button 98 is depressed, air is permitted to rush through the passageway formed by aperture 102 and into the chamber 57 about shaft 100 and past the O-ring 108, which O-ring 108 previously had been in sealing relationship between the head of screw 104 and the enclosure member 10. This in-rushing air breaks the vacuum within the chamber 57 and readily permits easy removal of the enclosure member 10 from the diaphragm 12. The enclosure member 10 is then moved to a holding location to permit removal of the garment 68 and placement of a subsequent garment on the platen 60.

It is noted that the illustrated apparatus achieves a necessary pressurized contact between the garment 66 and the heating element 86 with only one moving part (the diaphragm 12 and its attached tool buildup 56) and may be powered by a vacuum pump which is small and relatively inexpensive. It has also been found that applying pressure in this manner results in substantially greater uniformity of the pressure between the garment 66 and the heating element 86 than that which may be obtained with the other types of prior art machines discussed above when manufactured with the same degree of precision. Since the applied pressure is not limited or controlled by the operator in any way, greater uniformity in the quality of the resulted transfers result. Thus, a transferred garment produced by the present invention with a small operator is no different than one produced with a larger, stronger operator.

This quality independence of the resulting product from the operator is in marked contrast to that of the clam shell type design discussed above.

The complete separability of the enclosure member 10 from the diaphragm 12 permits the use of two or more diaphragms 12 and associated tool buildups 56 with a single enclosure member 10 having a heating element 86. This capability is significant because the actual transfer of an image 68 to a typical garment, such as T-shirt 66 takes approximately 15 seconds. The actual setup of aligning the garment 66 and transfer 68, on the other hand, will typically take from 3 to 5 minutes. Thus, several operators, each with their own tool buildup 56, could jointly use the same enclosure member 10 and heating element 86. Such a sharing arrangement would significantly reduce capital expenditures, operating costs and space requirement. The possibility of sharing the enclosure member 10 and its associating heating element 86 for several tool buildups 56 is particularly attractive for business conditions such as those which frequently exist in connection with the T-shirt transfers. These business operations are typically subject to large lulls where there is little or no business and peak periods in which business is quite brisk. The invention thus allows servicing of increased business volume with reduced expenditures.

The positioning of the heating element 86 underneath the top of dome 15 also results in an apparatus that is extremely energy conservative as compared with prior art machines. Operation of the heating element 86 within the closed dome 15 resembles an oven operation whereas the prior art heat transfer machines more closely resemble a hot plate which is exposed to the air and dissipates its heat into the atmosphere. This positioning of the heating element 86 also minimizes the danger of burning the operator's hands during setup and eliminates the need for heat shields which are presently being promoted in the industry.

The positioning of the heating element 86 within the dome also permits duel use of the apparatus as an oven for curing Plastisol heat transfers or Plastisols printed garments. Large transfer manufacturers, due to the economics involved, have a difficult time producing regional or local transfers for local events. The present invention also allows a small store owner to manufacture and cure any number of transfers himself. The economics offered by the present invention would allow a small store operator to manufacture and cure a number of transfers in anticipation of a particular contingency, such as the outcome of a local athletic event, for example. If the particular contingency did not develop, the unused transfer could be thrown away with minimal economic loss. If, on the other hand, the contingency developed, the transfers could be applied to T-shirts or other garments immediately for sale at a substantial profit. If the contingent transfers were manufactured and cured during lull periods of the store owners daily business, the manufacturing cost involved would be minimal. With prior art machines, a rather large conveyor type oven has been used to cure the transfers, an oven which is extremely expensive and requires substantial floor space.

In exercising such an option, the store owner would silk screen the desired transfer on a sheet of release paper. The release paper would then be placed on the platen 60 and the casting 10 placed over the platen 60. Although the heating element 86 would be operative during the curing mode, the vacuum pump would be inoperative so as to prevent engagement between the imaged release paper and the heating element 86. The transfer could be effectively cured for storage in approximately three minutes. When a specific customer does develop, a garment of appropriate size, fabric and color could be selected and the image transferred thereon with the described apparatus with the vacuum system operative once again.

The apparatus which has been illustrated and described thus far is a relatively small machine specifically designed to effectuate transfers of T-shirts. The invention is readily adaptable and advantageous for much larger scale operations, however. It would be possible, for example, to generate designer transfers for bed sheets and the like and to transfer the images to the sheets in the manner described above. Relatively large machines according to the present invention could be manufactured rather inexpensively which would provide the accuracy needed to make such an application practical. The customer could select bed sheets, pillow cases, towels, etc. from the stores standard inventory, selecting the proper size, color and manufacture prior to application of the transfer.

Considerable difficulties have also been experienced with present day machines in applying transfers to garments which are irregularly shaped and which have elastic bands. An elastic band, for example, produces multiple layers of fabric in bulky sections. When placed in a prior art heat transfer press, these multiple layers of fabric inhibit the pressure and heat that are necessary to effectuate the desired transfer. By modifying the shape of the platen 60 supporting the garment during the transfer process, the bulky sections may be placed below the heat transfer surface. This feature is extremely important when putting transfers on nylon jackets, running pants, hooded sweatshirts, and other types of garments.

Thus, it is apparent that there has been provided, in accordance with the invention, a heat transfer apparatus that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A heat transfer apparatus, comprising:

(a) a dome type enclosure member with a peripheral sealing surface, said enclosure member including an internal top portion that is in spaced relationship to the peripheral sealing surface;

(b) a heating element secured to the internal top portion of the enclosure member in spaced relationship to the peripheral sealing surface;

(c) a diaphragm in selective sealing relationship with the peripheral sealing surface and exposed to atmospheric pressure on one of its sides, the diaphragm cooperating with the enclosure member to define an internal chamber with the other of its sides; and (d) a tool buildup secured to the diaphragm, the tool buildup being disposed within the internal chamber when the peripheral sealing surface is in sealing relationship with the diaphragm.

2. An apparatus as recited in claim 1 further including means for selectively evacuating air from the chamber, the diaphragm being flexibly movable toward the heating element in response to evacuation of air from the chamber.

3. An apparatus as recited in claim 2 wherein the tool buildup is movable between a first position in spaced relationship with the heating element and a second position in contacting relationship with the heating element in response to evacuation of air from the chamber.

4. An apparatus as recited in claim 3 further including means for selectively permitting ambient air into the chamber after air has been evacuated from the chamber and while the peripheral sealing surface is in sealing relationship with the diaphragm.

5. An apparatus as recited in claim 4 further including handle means upon the enclosure member for manually moving the enclosure member.

6. An apparatus as recited in claim 4 wherein the means for selectively permitting air into the chamber includes a vacuum release mechanism that selectively blocks a passageway between the chamber and the ambient atmosphere, the vacuum release mechanism being biased to a closed position in which the passageway is blocked.

7. An apparatus as recited in claim 6 further including a pair of handles secured to the enclosure member with the vacuum release mechanism being located proximal to one of the handles.

8. An apparatus as recited in claim 4 further including means for controlling the temperature of the heating element.

9. An apparatus as recited in claim 8 further including a control box secured to the exterior of the enclosure member, the control box housing a timing mechanism and the temperature control means.

10. An apparatus as recited in claim 9 wherein the control box includes a vacuum gauge which is in communication with the chamber and provides a visual indication reflective of the air pressure within the chamber.

11. An apparatus as recited in claim 10 wherein the dome type enclosure member has a truncated pyramidal configuration.

12. An apparatus as recited in claim 11 wherein the tool buildup includes a platen member which is selectively engageable with the heating element and in spaced relationship to the diaphragm.

13. An apparatus as recited in claim 12 wherein the means for evacuating air from the chamber includes a fluid conduit extending through the enclosure member and providing fluid communication between the chamber an external vacuum source.

14. An apparatus as recited in claim 13 further including switch means responsive to placement of the enclosure member over the diaphragm for activating a vacuum pump.

15. An apparatus as recited in claim 14 wherein the switch means includes a plunger positioned in the enclosure member to contact the tool buildup whenever the enclosure member is placed upon the diaphragm.

* * * * *